US012688383B2

(12) United States Patent　　　　(10) Patent No.:　US 12,688,383 B2
　　Colavito et al.　　　　　　　　　　(45) Date of Patent:　　　Jul. 21, 2026

(54) SCANNING APPARATUS AND MODULAR POWER SOURCE

(71) Applicant: Hand Held Products, Inc., Charlotte, NC (US)

(72) Inventors: Stephen Colavito, Garnet Valley, PA (US); Michael Vincent Miraglia, Hamilton, NJ (US); Christopher Allen, East Windsor, NJ (US); Qinrong Zhu, Shanghai (CN); HongJian Jin, Suzhou (CN); Jerry Qian, Tongzhou (CN); Zhongqi Liu, Suzhou (CN); Oliver Ou, Suzhou (CN); David Wilz, Sewell, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 81 days.

(21) Appl. No.: 18/936,649

(22) Filed: Nov. 4, 2024

(65) Prior Publication Data

US 2025/0061295 A1　　Feb. 20, 2025

Related U.S. Application Data

(63) Continuation of application No. 18/308,472, filed on Apr. 27, 2023, now Pat. No. 12,164,998, which is a
(Continued)

(30) Foreign Application Priority Data

Jul. 20, 2018　(CN) .......................... 201810802932.6

(51) Int. Cl.
　　 G06K 7/14　　　　(2006.01)
　　 G06K 7/10　　　　(2006.01)
　　　　　　(Continued)

(52) U.S. Cl.
　　 CPC ....... G06K 7/1413 (2013.01); G06K 7/10821 (2013.01); H02J 7/00 (2013.01); H02J 7/731 (2026.01); H02J 7/345 (2013.01)

(58) Field of Classification Search
　　 CPC ............. G06K 7/1413; G06K 7/10821; G06K 7/10158; G06K 7/1098; H02J 7/00;
　　　　　　　(Continued)

(56) References Cited

U.S. PATENT DOCUMENTS 6,307,349 B1　10/2001　Koenck et al.
8,816,816 B2 *　8/2014　Ciervo .................. G06F 1/1632
　　　　　　　　　　　　　　　340/4.34
(Continued)

FOREIGN PATENT DOCUMENTS

CN　　　101189564 A　　5/2008
CN　　　102931695 A　　2/2013

OTHER PUBLICATIONS

Decision to grant a European patent Mailed on Jul. 17, 2025 for EP Application No. 23161079, 8 page(s).
(Continued)

*Primary Examiner* — Seung H Lee
(74) *Attorney, Agent, or Firm* — Alston & Bird LLP

(57)　　　　　ABSTRACT

A scanning apparatus comprising a control system configured to determine a type of a removable power source connected to the scanning apparatus, select one or more charging parameters based on the determined type of the removable power source, transmit the selected one or more charging parameters to a universal power interface and/or a charging circuit, modify an operational mode of the scanning apparatus based on the selected one or more charging parameters, determine if a charge of the removable power source is less than a predetermined power threshold, determine if the scanning apparatus is mounted on a charging
(Continued)

100 cradle, and initiate charging of the removable power source if it is determined that the charge of the removable power source is less than the predetermined power threshold and the scanning apparatus is mounted on the charging cradle.

20 Claims, 10 Drawing Sheets

Related U.S. Application Data continuation of application No. 17/226,507, filed on Apr. 9, 2021, now Pat. No. 11,675,987, which is a continuation of application No. 16/516,380, filed on Jul. 19, 2019, now Pat. No. 11,003,876.

(51) Int. Cl.
| | |
|---|---|
| *H02J 7/00* | (2006.01) |
| *H02J 7/70* | (2026.01) |
| *H02J 7/34* | (2006.01) |

(58) Field of Classification Search
    CPC ......... H02J 7/731; H02J 7/345; G06F 1/1632; G06F 1/3278; G06F 1/3206
    See application file for complete search history.

(56) References Cited

U.S. PATENT DOCUMENTS

| | | | |
|---|---|---|---|
| 9,748,779 | B1 | 8/2017 | Powell et al. |
| 2006/0244422 | A1 | 11/2006 | Digiovanna et al. |
| 2006/0284593 | A1 | 12/2006 | Nagy et al. |
| 2009/0233550 | A1 | 9/2009 | Ryu |
| 2012/0281392 | A1 | 11/2012 | Workman et al. |
| 2013/0111227 | A1 | 5/2013 | Sauerwein, Jr. |
| 2013/0307489 | A1 | 11/2013 | Kusch et al. |
| 2014/0340043 | A1* | 11/2014 | Hargrave .................. H02J 7/94 320/134 |
| 2016/0014545 | A1 | 1/2016 | Tian et al. |
| 2016/0094070 | A1 | 3/2016 | Mazzone |
| 2016/0204636 | A1 | 7/2016 | Allen et al. |
| 2016/0285289 | A1 | 9/2016 | Arends |
| 2017/0208639 | A1 | 7/2017 | Lee et al. |
| 2018/0012049 | A1 | 1/2018 | Ngo |
| 2018/0129247 | A1* | 5/2018 | Inanc .................... G06F 1/1632 |
| 2018/0205249 | A1 | 7/2018 | Colavito et al. |

OTHER PUBLICATIONS

U.S. Appl. No. 18/308,472, filed Apr. 27, 2023, 2023/0259730, Pending.

U.S. Appl. No. 17/226,507, filed Apr. 9, 2021, U.S. Pat. No. 11,675,987, Issued.

U.S. Appl. No. 16/516,380, filed Jul. 19, 2019, U.S. Pat. No. 11,003,876, Issued.

European search report Mailed on Feb. 20, 2026 for EP Application No. 25211564, 6 page(s).

Annex Communication Pursuant to Rule 94(3) issued in European Application No. 19187451.0 on Mar. 25, 2021, 2 pages.

Annex to the communication Mailed on Mar. 25, 2021 for EP Application No. 19187451.

CN Notice of Allowance Mailed on Mar. 19, 2024 for CN Application No. 201810802932, 8 page(s).

Communication about intention to grant a European patent Mailed on Oct. 19, 2022 for EP Application No. 19187451, 52 pages.

Communication from the Examining Division Mailed on Mar. 25, 2021 for EP Application No. 19187451.

Communication Pursuant to Rule 94(3) issued in European Application No. 19187451.0 on Mar. 25, 2021, 2 pages.

Decision to grant a European patent Mailed on Mar. 10, 2023 for EP Application No. 19187451.

European search opinion Mailed on Dec. 10, 2019 for EP Application No. 19187451, 4 page(s).

European search opinion Mailed on Dec. 10, 2019 for EP Application No. 19187451.0, 4 pages.

European search report Mailed on Dec. 10, 2019 for EP Application No. 19187451, 2 page(s).

European search report Mailed on Dec. 10, 2019 for EP Application No. 19187451.0, 2 pages.

Extended European Search Report for Application No. 19187451.0, dated Dec. 10, 2019, 8 pages.

Non-Final Office Action received for U.S. Appl. No. 17/226,507, mailed on Aug. 25, 2022, 7 pages.

Non-Final Rejection Mailed on Aug. 19, 2020 for U.S. Appl. No. 16/516,380.

Non-Final Rejection Mailed on Aug. 25, 2022 for U.S. Appl. No. 17/226,507, 7 page(s).

Notice of Allowance and Fees Due (PTOL-85) Mailed on Aug. 6, 2024 for U.S. Appl. No. 18/308,472, 8 page(s).

Notice of Allowance and Fees Due (PTOL-85) Mailed on Jan. 12, 2021 for U.S. Appl. No. 16/516,380.

Notice of Allowance and Fees Due (PTOL-85) Mailed on Jan. 31, 2023 for U.S. Appl. No. 17/226,507.

Notice of Allowance and Fees Due (PTOL-85) Mailed on Mar. 27, 2023 for U.S. Appl. No. 17/226,507, 2 page(s).

Requirement for Restriction/Election Mailed on Mar. 29, 2024 for U.S. Appl. No. 18/308,472, 6 page(s).

Decision to grant a European patent Mailed on Nov. 6, 2025 for EP Application No. 23161079, 2 page(s).

\* cited by examiner

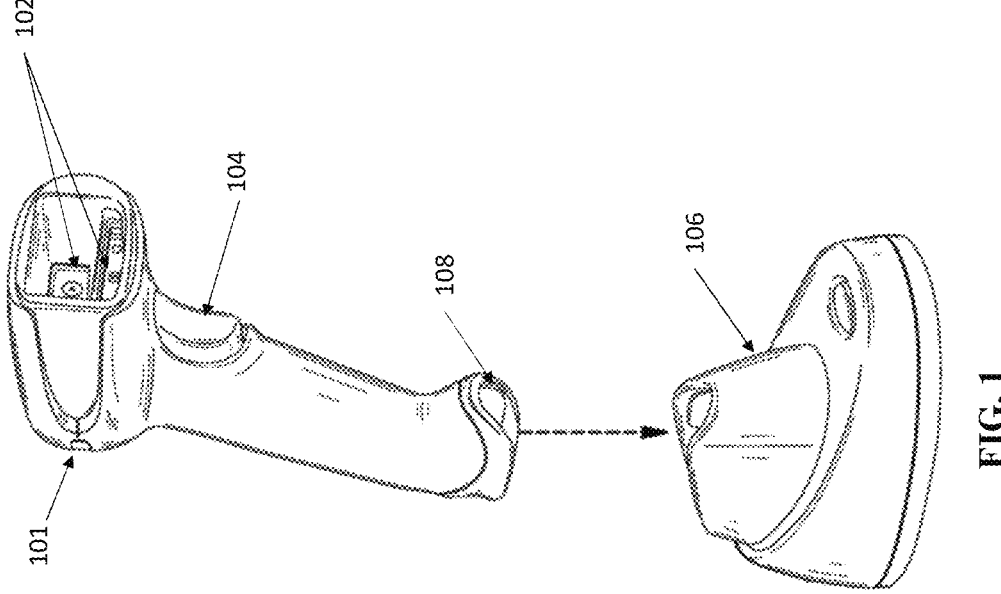
102
104
108
106
101
FIG. 1
100

SCANNING APPARATUS AND MODULAR POWER SOURCE

CROSS-REFERENCE TO RELATED APPLICATIONS

This application is a continuation of U.S. application Ser. No. 18/308,472, filed Apr. 27, 2023, which is a continuation of U.S. application Ser. No. 17/226,507, filed Apr. 9, 2021 (now U.S. Pat. No. 11,675,987, issued Jun. 13, 2023), which application claims the benefit of U.S. application Ser. No. 16/516,380, filed Jul. 19, 2019 (now U.S. Pat. No. 11,003, 876, issued May 11, 2021), which application claims the benefit of Chinese Patent Application No. 201810802932.6 filed Jul. 20, 2018, the disclosure of which applications are herein incorporated by reference in their entireties.

FIELD OF INVENTION

The present disclosure relates generally to scanning systems, and, more particularly, to scanning devices with modular power sources.

BACKGROUND

Scanning systems (e.g., barcode scanners and the like) are prevalent in a variety of industries and may facilitate categorizing, organizing, and identifying objects (e.g., files, products, packages, etc.). For example, scanning systems may be employed in a retail context in both point-of-sale transactions as well as in warehouse inventory management. Applicant has identified a number of deficiencies and problems associated with conventional scanning systems and associated power sources. Through applied effort, ingenuity, and innovation, many of these identified problems have been solved by developing solutions that are included in embodiments of the present disclosure, many examples of which are described in detail herein.

BRIEF SUMMARY

Systems, apparatuses, methods, and computer program products are disclosed herein for improved scanning systems and associate power sources. In one embodiment, a scanning apparatus is provided. The scanning apparatus may include a universal power interface configured to receive a removable power source connected thereto where the removable power source includes a power storage unit and a charging circuit. The scanning apparatus may further include scanning circuitry that may be in electrical communication with the universal power interface and configured to scan a target. The scanning apparatus may further include a processor communicably coupled with the scanning circuitry and the universal power interface. In an instance in which the universal power interface receives the removable power source, the processor may be configured to determine a type of the removable power source, select one or more parameters based on the determined type of the removable power source, and operate at least one of the scanning apparatus or the charging circuit in the removable power source based on the one or more selected parameters.

In some embodiments, the scanning apparatus may further include communications circuitry configured to provide wireless communication between the scanning apparatus and a charging cradle.

In some cases, the scanning apparatus may further include a docking interface configured to provide electrical communication between a charging cradle and the removable power source received by the scanning apparatus. In such an embodiment, the processor may be configured to operate the charging circuit so as to charge the power storage unit based on the one or more selected parameters via the electrical communication between the charging cradle and the removable power source received in the scanning apparatus.

In some embodiments, the type of the removable power source includes a battery type removable power source that includes a battery as the power storage unit. In such an embodiment, the one or more parameters may define battery charging parameters that, in an instance in which the processor determines the type of the removable power source as the battery type removable power source, the processor may transmit battery charging parameters to the charging circuit.

In some other embodiments, the type of the removable power source includes a super-capacitor type removable power source that includes a super-capacitor as the power storage unit. In such an embodiment, the one or more parameters may include super-capacitor charging parameters that, in an instance in which the processor determines the type of the removable power source as the super-capacitor type removable power source, the processor may transmit super-capacitor type charging parameters to the charging circuit.

In some cases, the universal power interface, in the operational configuration, may be in electrical communication with a memory of the removable power source. In such an embodiment, the processor may further, via connection with the universal power interface, query the memory of the removable power supply to identify the type of the removable power source.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The accompanying drawings illustrate embodiments of the invention, and, together with the specification, including the general description above and the detailed description which follows, serve to explain the features of the present invention.

FIG. 1 shows a perspective view of a scanning system in accordance with an example embodiment of the present disclosure;

DETAILED DESCRIPTION OF THE INVENTION

Figure 2:
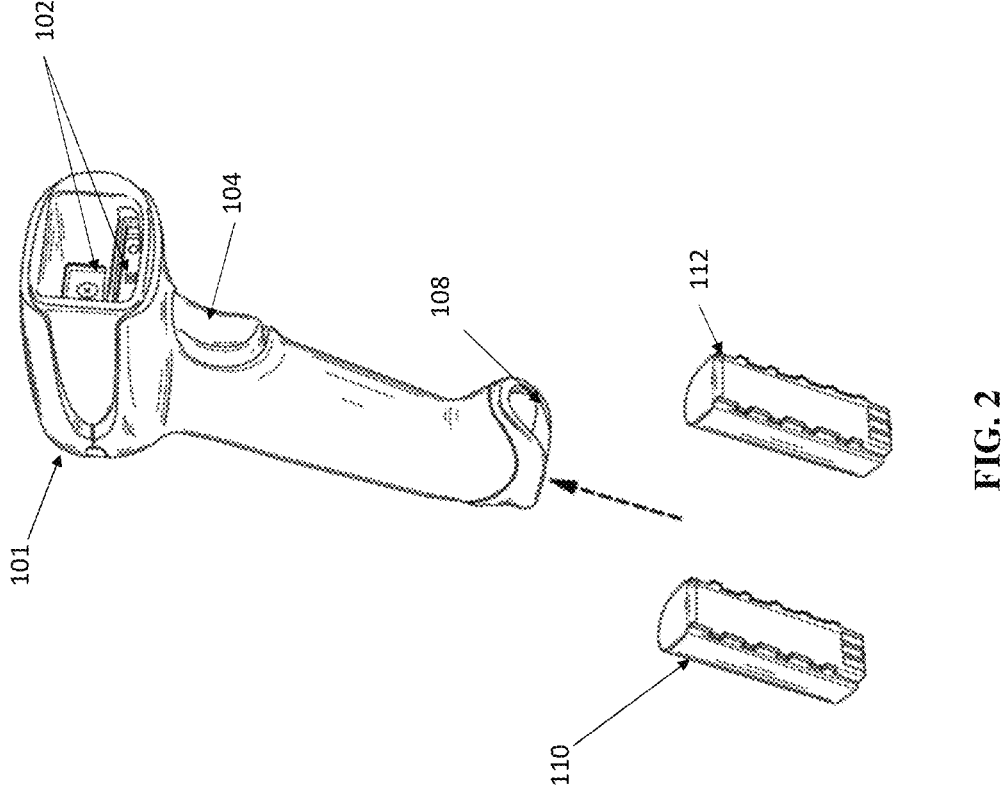
FIG. 2 shows a scanning apparatus of FIG. 1 with removable power sources of different types in accordance with some example embodiments of the present disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The word "exemplary" is used herein to mean "serving as an example, instance, or illustration." Any implementation described herein as "exemplary" is not necessarily to be construed as preferred or advantageous over other implementations.

As used herein, example embodiments of the "scanning apparatus" are described in reference to a barcode scanning device for case of description. As would be evident to one of ordinary skill in the art in light of the present disclosure, however, the embodiments of the present invention may be equally applicable to scanning devices and systems of any type (e.g., direct part marking (DPB) scanners, barcode scanners, radio frequency identification (RFID) scanners, or the like). Furthermore, while the scanning apparatus is illustrated herein with a gun-style housing (e.g., as described with reference to FIGS. 1-3 below), the scanning apparatus may be embodied otherwise (e.g., body-worn type, mobile-computer type, vehicle-mounted type, sled type, etc.).

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an device to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term "circuitry" also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Overview

As noted above, scanning systems and associated scanning apparatuses are used in a variety of industries. Often, these scanning apparatuses are wireless barcode scanners that are powered by a rechargeable and/or removable power source (RPS). Conventional power systems often rely upon rechargeable batteries in order provide energy for continuous periods of operation. With regard to scanning apparatuses, however, these devices may often be operated in short bursts of time followed by periods of rest. As a result of the continued growth in power technologies, super-capacitors and other types of emerging technologies may also be suitable as RPSs in scanning apparatuses.

Exemplary Scanning System

Figure 3:
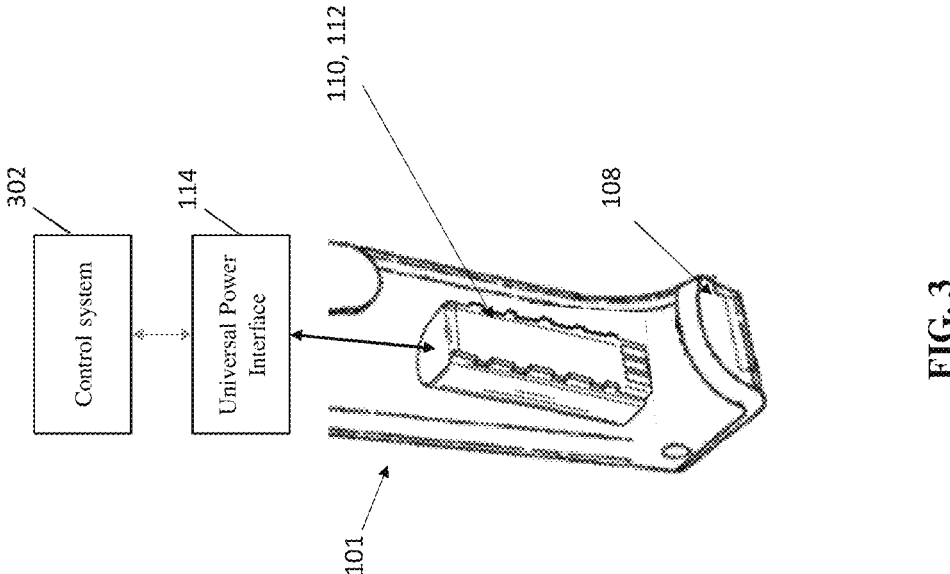
FIG. 3 shows cut-out view of the scanning apparatus of FIGS. 1-2 in an operational configuration with a removable power source received therein in accordance with some example embodiments of the present disclosure.

With reference to FIGS. 1-3, an example scanning system 100 is illustrated in accordance with example embodiments of the present disclosure. As shown in FIG. 1, the scanning system 100 may include a scanning apparatus 101 and a charging cradle 106. As shown in FIG. 1, the scanning apparatus 101 may be embodied as a gun-type scanning device with a trigger 104 that may receive user inputs. As would be evident to one of ordinary skill in the art in light of the present disclosure, the scanning apparatus 101 may include scanning circuitry 102 (e.g., processors, lenses, illumination devices, cameras, and/or the like) for performing scanning operations. By way of example, a user may direct the scanning apparatus 101 in the direction of a target. The user may input a command (e.g., via the trigger 104) and cause the scanning circuitry (e.g., via commands transmitted by a processor described hereafter) to scan the target. In some embodiments, the information gathered by the scanning circuitry 102 may be transmitted (e.g., via communications circuitry 708 in FIG. 7) to the charging cradle 106 and further to a host (not shown) in network communication with the charging cradle 106.

With continued reference to FIG. 1, the scanning system 100 may further include a charging cradle 106 configured to receive the scanning apparatus 101 in a charging configuration. As shown, the scanning apparatus 101, in some embodiments, may include a docking interface 108 configured to connect the scanning apparatus 101 with the charging cradle 106. Furthermore, the docking interface 108 (e.g., via the interfaces described hereafter with reference to FIGS. 4-5) may provide electrical communication between the charging cradle 106 and a removable power source (RPS) (e.g., RPS 110 or RPS 112) received by the scanning apparatus 101.

In an example embodiment, the RPS (e.g., RPS 110 or RPS 112) corresponds to a power source that may be configured to store energy to power the scanning apparatus 101, when the RPS (e.g., RPS 110 or RPS 112) is received by the scanning apparatus 101. With reference to FIG. 2, RPSs 110, 112 of different types are illustrated along with the scanning apparatus 101 of FIG. 1. In an example embodiment, the scanning apparatus 101 may be configured to receive a battery type RPS 110 or a super-capacitor type RPS 112. In some embodiments, the battery type RPS 110 may be configured to provide energy for long periods of continuous operation such as instances in which the scanning apparatus 101 is continuously used to scan inventory in a warehouse cataloguing operation. While RPS 110 may provide for long periods of operation (e.g., via usage of a battery), charging the battery type RPS 110 may also require long periods of time. Conversely, a super-capacitor type RPS 112 may store less energy than the battery type RPS 110, but may be charged more quickly in comparison to the battery type RPS 110. As such, the super-capacitor RPS 112 may provide energy for short bursts of time such as instances in which the scanning apparatus 101 is used to momentarily scan products at a point-of-sale before returning to the charging cradle 106.

Referring to FIG. 3, the scanning apparatus 101 includes a universal power interface 114 that allows the scanning apparatus 101 to receive and operate with different types of RPSs (e.g., RPS 110 and RPS 112). The universal power interface 114 is described later in conjunction with FIG. 4. In an example embodiment, as illustrated in FIG. 3, the universal power interface 114 is further coupled to a control system 302 of the scanning apparatus 110. The structure and operation of the control system 302 is described later in conjunction with FIG. 6.

Figure 4:
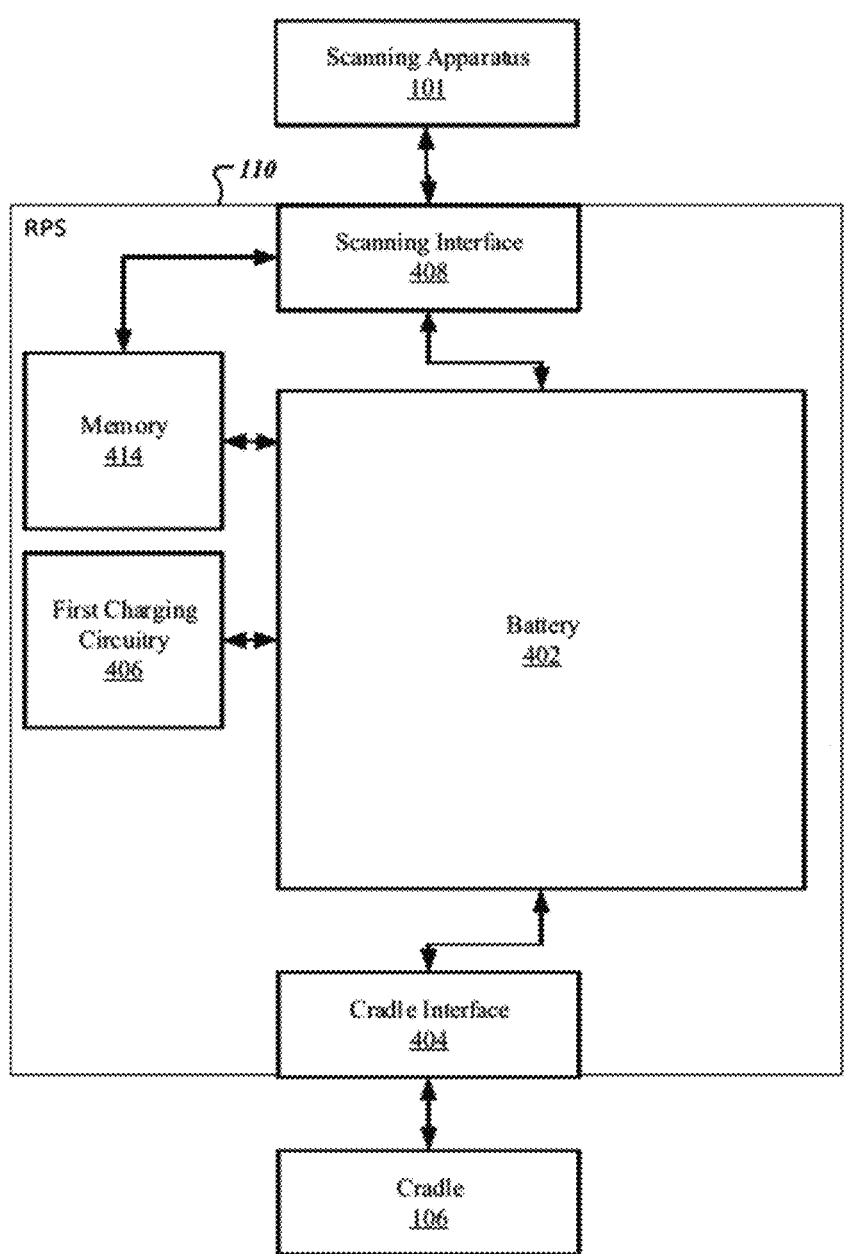
FIG. 4 shows a block diagram illustrating various hardware elements of a removable power source (RPS) that includes a battery in accordance with some example embodiments described herein.

With reference to FIG. 4, an example battery type RPS 110 is illustrated with a battery 402, a cradle interface 404, a first charging circuit 406, a scanning interface 408, and a memory 414. In some example embodiments, each of the battery 402, the cradle interface 404, the first charging circuit 406, the scanning interface 408, and the memory 414 are electrically coupled with each other.

The battery 402 may correspond to a power storage unit that may be configured to store energy to be used by the scanning apparatus 101 to perform one or more functionalities such as a scanning operation. In an example embodiment, the battery 402 may facilitate long periods of operation of the scanning apparatus 101 in comparison to the RPS 112, described hereafter with reference to FIG. 5. In an example embodiment, the battery 402 may supply a constant power to the scanning apparatus 101 through the scanning interface 402. After the charge of the battery 402 is depleted, the operator of the scanning apparatus 101 may mount the scanning apparatus 101 on the cradle 106 (e.g., via the docking interface 108). Thereafter, the battery 402 may receive power through the first charging circuit 406 and the cradle interface 404 in order to be recharged. The battery 402 may, for example, include a Lithium Ion battery and/or any other rechargeable battery of any type without limitation.

The cradle interface 404 may include one or more electrical contacts that may allow the RPS 110 to electrically couple with the cradle 406 when the scanning apparatus 101 is mounted on the cradle 106 (e.g., via the docking interface 108). In an example embodiment, the cradle interface 404 may be configured to draw or otherwise receive power from the cradle 106 and further supply power to the battery 402 via the first charging circuit 406.

In an example embodiment, the first charging circuit 406 may be configured to regulate the power received from the cradle 106 through the cradle interface 404 such that a constant voltage and a constant current is supplied to the battery 402 for recharging purposes. In some examples, the first charging circuit 406 may be configured to regulate the power received from the cradle 106 based on one or more charging parameters received from the scanning apparatus 101. In an example embodiment, the one or more charging parameters may include a constant voltage and/or constant current that is to be supplied to the battery 402 for recharging purposes. In an example embodiment, the first charging circuit 406 may be configured to receive the one or more charging parameters through the scanning interface 408. In some examples, the charging circuit may include one or more of rectifiers, DC-DC convertors, and/or voltage and current regulators that are configured to generate constant voltage and constant current based on the received power from the cradle 106.

In an example embodiment, the scanning interface 408 may correspond to a communication interface that allows the RPS 110 to electrically communicate with the scanning apparatus 101. In an example embodiment, RPS 110 may receive data, instructions, information, or the like from the scanning apparatus 101 through the scanning interface 408 in accordance with one or more communication interface protocols such as, but not limited to, I2C communication interface, CAN communication interface, and/or 1-Wire communication interface. For example, the RPS 110 may receive one or more charging parameters from the scanning apparatus 101 via the scanning interface 408.

The memory 414 may include suitable logic, circuitry, and/or interfaces that are adapted to store information pertaining to a type of RPS in which the memory 414 has been installed. The memory 414 may be implemented as a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof.

Figure 5:
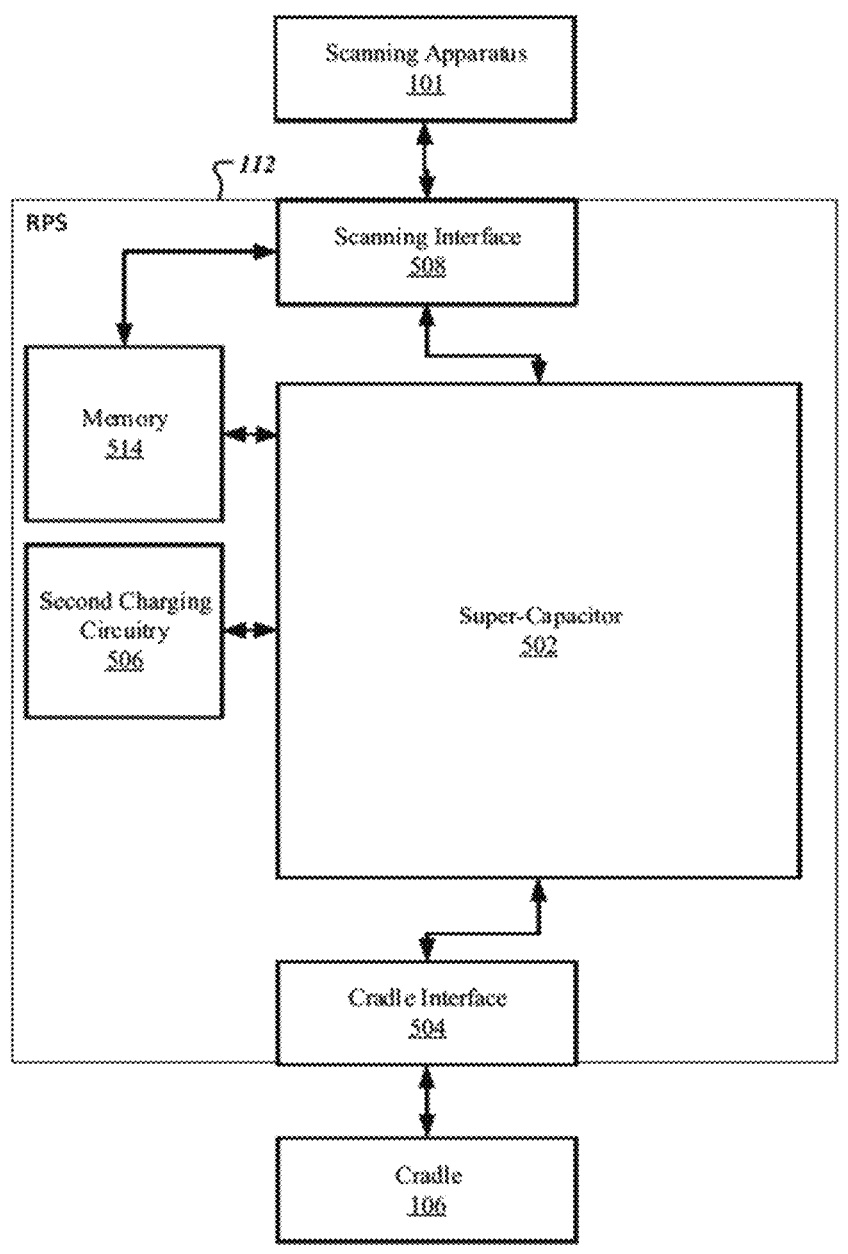
FIG. 5 shows a block diagram illustrating various hardware elements of a removable power source (RPS) that includes a super-capacitor in accordance with some example embodiments described herein.

With reference to FIG. 5, an example super-capacitor type RPS 112 is illustrated with a super-capacitor 502, a second charging circuit 506, a cradle interface 504, a memory 514, and a scanning interface 508. In some example embodiments, each of the super-capacitor 502, the cradle interface 504, the second charging circuit 506, the scanning interface 508, and the memory 514 are electrically coupled with each other.

The super-capacitor 502 may correspond to the power storage unit that may be configured to store energy to be used by the scanning apparatus 101 to perform one or more functionalities such as a scanning operation. In an example embodiment, the super-capacitor 502 may facilitate short periods of operation of the scanning apparatus 101 in comparison to the RPS 110 described above with reference to FIG. 4. In an example embodiment, the super-capacitor 502 may supply a varying power to the scanning apparatus 101 through the scanning interface 508, as the voltage across the super-capacitor 502 drops when the scanning apparatus 101 is operated. After the charge of the super-capacitor 502 is depleted, the operator of the scanning apparatus 101 may mount the scanning apparatus 101 on the cradle 106 (e.g., via docking interface 108). Thereafter, the super-capacitor 502 may receive power through the second charging circuit 506 and the cradle interface 504 in order to be recharged. The super-capacitor 502, for example, may include double layer capacitors, pseudo-capacitors, hybrid capacitors, and/or type of super-capacitor configuration without limitation.

Similar to the configuration described in FIG. 4, the cradle interface 504 may include one or more electrical contacts that may allow the RPS 112 to electrically couple with the cradle 506 when the scanning apparatus 101 is mounted on the cradle 106 (e.g., via the docking interface 108). In an example embodiment, the cradle interface 504 may be configured to draw or otherwise receive power from the cradle 106 and further supply power to the super-capacitor 502 via the second charging circuit 506.

In an example embodiment, the second charging circuit 506 may be configured to regulate the power received from the cradle 106 through the cradle interface 504 such that a constant voltage and a constant current is supplied to the super-capacitor 502 for recharging. In some examples, the second charging circuit 506 may be configured to regulate the power received from the cradle 106 based on the one or more charging parameters received from the scanning apparatus 101. In an example embodiment, the one or more charging parameters may include a constant voltage and/or a constant current that is to be supplied to the super-capacitor 502 for recharging. Additionally or alternatively, the one or more charging parameters may include a value of a cut-off voltage. In an example embodiment, the cut-off voltage may correspond to a value of voltage beyond which the super-capacitor 502 is not charged. For example, when a voltage across of the super-capacitor 502 is equal to the cut-off voltage, the second charging circuit 506 may be configured to stop charging of the super-capacitor 502. In an example embodiment, the second charging circuit 506 may be configured to receive the one or more charging parameters through the scanning interface 508. In some examples, the second charging circuit 506 may include one or more of rectifiers, DC-DC convertors, and/or voltage and current regulators, that are configured to generate constant voltage and the constant current based on the power received from the cradle 106.

Also similar to the configuration described with reference to FIG. 4, the scanning interface 508 may correspond to a communication interface that allows the RPS 112 to electrically communicate with the scanning apparatus 101. In an example embodiment, RPS 112 may receive data, instructions, information, or the like from the scanning apparatus 101 through the scanning interface 508 in accordance with one or more communication interface protocols such as, but not limited to, 12C communication interface, CAN communication interface, and/or 1-Wire communication interface. For example, the RPS 112 may receive one or more charging parameters from the scanning apparatus 101 via the scanning interface 508.

Additionally, the memory 514 may include suitable logic, circuitry, and/or interfaces that are adapted to store information pertaining to a type of RPS in which the memory 514 has been installed. The memory 514 may be implemented as a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof.

Figure 6:
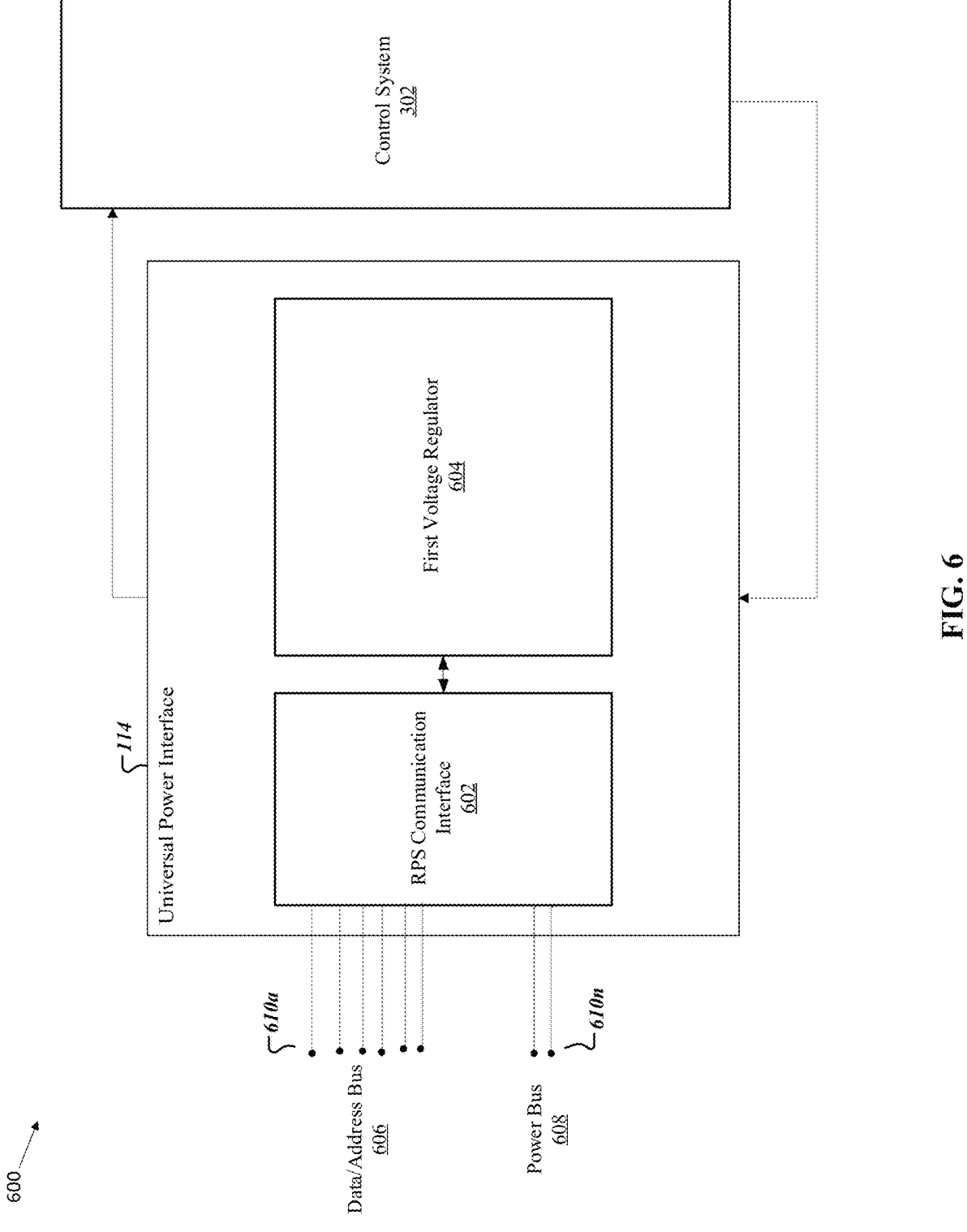
FIG. 6 shows a block diagram of a universal power interface in accordance with some example embodiments of the present disclosure.

Referring to FIG. 6, a block diagram 600 of the universal power interface 114, is illustrated. The universal power interface 114 includes an RPS communication interface 602 and a first voltage regulator 604.

The RPS communication interface 602 may include suitable logic and/or circuitry that allows different types of RPSs (e.g., RPS 110 and RPS 112) to be coupled to the scanning apparatus 101. For example, the RPS communication interface 602 includes a data/address bus 606 and a power bus 608. The data/address bus 606 enables sharing of data/information between the control system 302 and the different types of RPSs (e.g., RPS 110 and RPS 112), as is further described in conjunction with FIG. 8. Alternatively or additionally, the control system 302 may be configured to transmit instructions to the RPS (e.g., RPS 110 and RPS 112), as is further described in FIG. 8. In an example embodiment, the sharing of the data/information between the control system 302 and the RPS (e.g., RPS 110 and RPS 112) is facilitated in accordance with one or more communication protocols such as, but are not limited to, I2C, CAN, 1-Wire, and UART.

In an example embodiment, the power bus 608 may correspond electrical communication path that facilitates power transfer from the RPS (e.g., the RPS 110 and the RPS 112) to the control system 302 through the first voltage regulator 604. In some examples, the data/address bus 606 and the power bus 608 may terminate at one or more contact pads 610a-610n in the scanning apparatus 101. In an example embodiment, the one or more contact pads 610a-610n may correspond to electrical pads that abut corresponding contact pads (not shown) on the RPS (e.g., RPS 110 and RPS 112) when the RPS (e.g., RPS 110 and RPS 112) is received by the scanning apparatus 101.

The first voltage regulator 604 may include suitable logic and/or circuitry that may enable the first voltage regulator 604 to receive power from the RPS (e.g., RPS 110 and RPS 112) and may be configured to supply stable power to the control system 302 based on the power received. For example, based on the power, the first voltage regulator 604 may be configured to supply a stable 3.3 Volts to the control system 302. In some examples, the first voltage regulator 604 may include one or more of rectifiers and/or one or more DC-DC convertors which operate in tandem or may operate independently to supply stable power and/or voltage to the control system 302. In some examples, the first voltage regulator 604 may be configured to operate within a predetermined voltage range that allows the first voltage regulator 604 to be used with the different types of the RPSs (e.g., the super-capacitor type RPS 112 and the battery RPS 110). In some examples, the predetermined voltage range lies within 2.5 to 5.5 Volts. As would be evident to one of ordinary skill in the art, the voltage range may, in some embodiments, be determined by the super-capacitor type RPS in that super-capacitors may have wider voltages ranges as compared to battery type RPSs. In some examples, the first voltage regulator 604 may be programmable. For instance, the first voltage regulator 604 may receive one or more instructions from the control system 302 and the first voltage regulator 604 may alters its operation accordingly. For example, the first voltage regulator 604 may receive an instruction to modify the stable voltage output supplied to the control system 302 and/or other components of the scanning apparatus 101, as is further described in conjunction with FIG. 8. In some examples, the first voltage regulator 604 may receive the one or more instructions in accordance with the type of RPS received by the scanning apparatus 101, as is further described in conjunction with FIG. 8.

Figure 7:
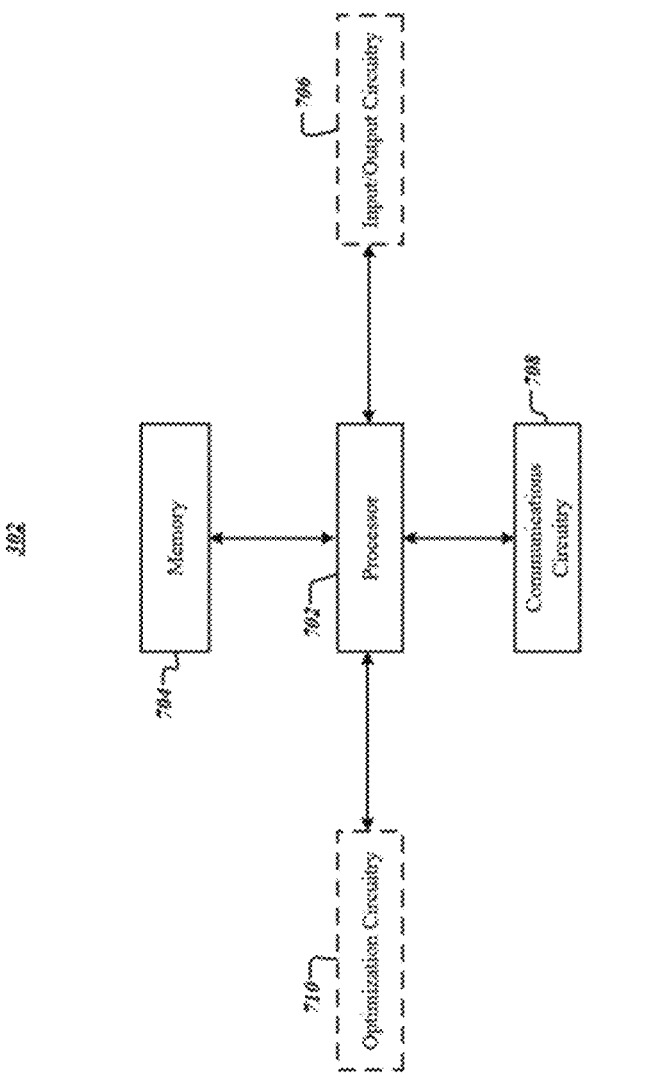
FIG. 7 shows a block diagram illustrating various hardware elements of the scanning system in accordance with some example embodiments described herein.

FIG. 7 illustrates a block diagram 700 of the control system 302 of the scanning apparatus 101, according to one or more embodiments described herein. The control system 302 includes a processor 702, a memory 704, input/output circuitry 706, communications circuitry 708, and/or optimization circuitry 710. Although components 702-710 are described in some cases using functional language, it should be understood that the particular implementations necessarily include the use of particular hardware. It should also be understood that certain of the components 702-710 may include similar or common hardware. For example, two sets of circuitry may both leverage use of the same processor 702, memory 704, communications circuitry 708, or the like to perform their associated functions, such that duplicate hardware is not required for each set of circuitry. The use of the term "circuitry" as used herein includes particular hardware configured to perform the functions associated with respective circuitry described herein. It will be understood that some of the components described in connection with the scanning apparatus 101 may be housed within the scanning apparatus 101, while other components may be housed within another device of the scanning system 100, or by yet another device not expressly illustrated in FIG. 1.

In some embodiments, the processor 702 (and/or co-processor or any other processing circuitry assisting or otherwise associated with the processor) may be in communication with the memory 704 via a bus for passing information among components of the scanning apparatus 101. The memory 704 may be non-transitory and may include, for example, one or more volatile and/or non-volatile memories. In other words, for example, the memory may be an electronic storage device (e.g., a non-transitory computer readable storage medium). The memory 704 may be configured to store information, data, content, applications, instructions, or the like, for enabling the scanning apparatus 101 to carry out various functions in accordance with example embodiments of the present invention.

The processor 702 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, or multiple processors internal to the scanning apparatus 101.

In an example embodiment, the processor 702 may be configured to execute instructions stored in the memory 704 or otherwise accessible to the processor 702. Alternatively or additionally, the processor 702 may be configured to execute hard-coded functionality. As such, whether configured by hardware or by a combination of hardware with software, the processor 702 may represent an entity (e.g., physically embodied in circuitry) capable of performing operations according to an embodiment of the present invention while configured accordingly. Alternatively, as another example, when the processor 702 is embodied as an executor of software instructions, the instructions may specifically configure the processor 702 to perform the algorithms and/or operations described herein when the instructions are executed.

The memory 704 may include suitable logic, circuitry, and/or interfaces that are adapted to store a set of instructions that is executable by the processor 702 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory 704 may be integrated with the processor 702 on a single chip, without departing from the scope of the disclosure.

The scanning apparatus 101 further includes, in some embodiments, input/output circuitry 706 that may, in turn, be in communication with processor 702 to provide output to a user and to receive input from a user, user device, or another source. In this regard, the input/output circuitry 706 may comprise a display that may be manipulated by a mobile application. In some embodiments, the input/output circuitry 706 may also include additional functionality such as a trigger (e.g., trigger 104 in FIG. 1), keyboard, a mouse, a joystick, a touch screen, touch areas, soft keys, a microphone, a speaker, or other input/output mechanisms. The processor 702 and/or user interface circuitry comprising the processor 702 may be configured to control one or more functions of a display through computer program instructions (e.g., software and/or firmware) stored on a memory accessible to the processor (e.g., memory 704, and/or the like).

The communications circuitry 708 may be any means such as a device or circuitry embodied in either hardware or a combination of hardware and software that is configured to receive and/or transmit data from/to a network and/or any other device, circuitry, or module in communication with the scanning apparatus 101 or a part of the scanning system 100. In this regard, the communications circuitry 708 may include, for example, a network interface for enabling communications with a wired or wireless communication network. For example, the communications circuitry 708 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the scanning apparatus 101 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In an example embodiment, the communications circuitry 708 enables the control system 302 to communicate with the cradle 106. For example, through the communications circuitry 708, the control system 302 is able to communicate data/information (e.g., scanned data) to the cradle 106, which may further transmit the data/information to a host computing device (not shown). In another example, the communications circuitry 708 may enable the control system 302 to communicate with the RPS (e.g., the RPS 110 and the RPS 112) through the universal power interface 114. For example, the communications circuitry 708 may be communicatively coupled to the RPS communication interface 602 through the data/address bus 406. In an example embodiment, the processor 702 may be configured to transmit data/instruction to the RPS (e.g., the RPS 110 and the RPS 112) through the communications circuitry 708. Optimization circuitry 710 includes hardware components designed to determine the type of the RPS (e.g., the RPS 110 or the RPS 112), as is further described in the FIG. 8. Thereafter, based on the determined type of the RPS (e.g., the RPS 110 and the RPS 112), the optimization circuitry 710 may be configured to select one or more parameters for operating the scanning apparatus 101 and/or the charging circuitry in the RPS (e.g., the RPS 110 and the RPS 112), as is further described in FIG. 8. By way of example, the optimization circuitry 710 may, in an instance in which the processor 702 determines the type of the removable power source to include a super-capacitor which has limited energy-storage capacity, the optimization circuitry 710 may minimize energy consumption (e.g., use low-energy Bluetooth radio, enter low-power modes, disable WiFi, minimize scanner exposure, etc.), as is further described in FIG. 8. Optimization circuitry 710 may utilize processing circuitry, such as the processor 702, to perform its corresponding operations, and may utilize memory 704 to store collected information.

Figure 8:
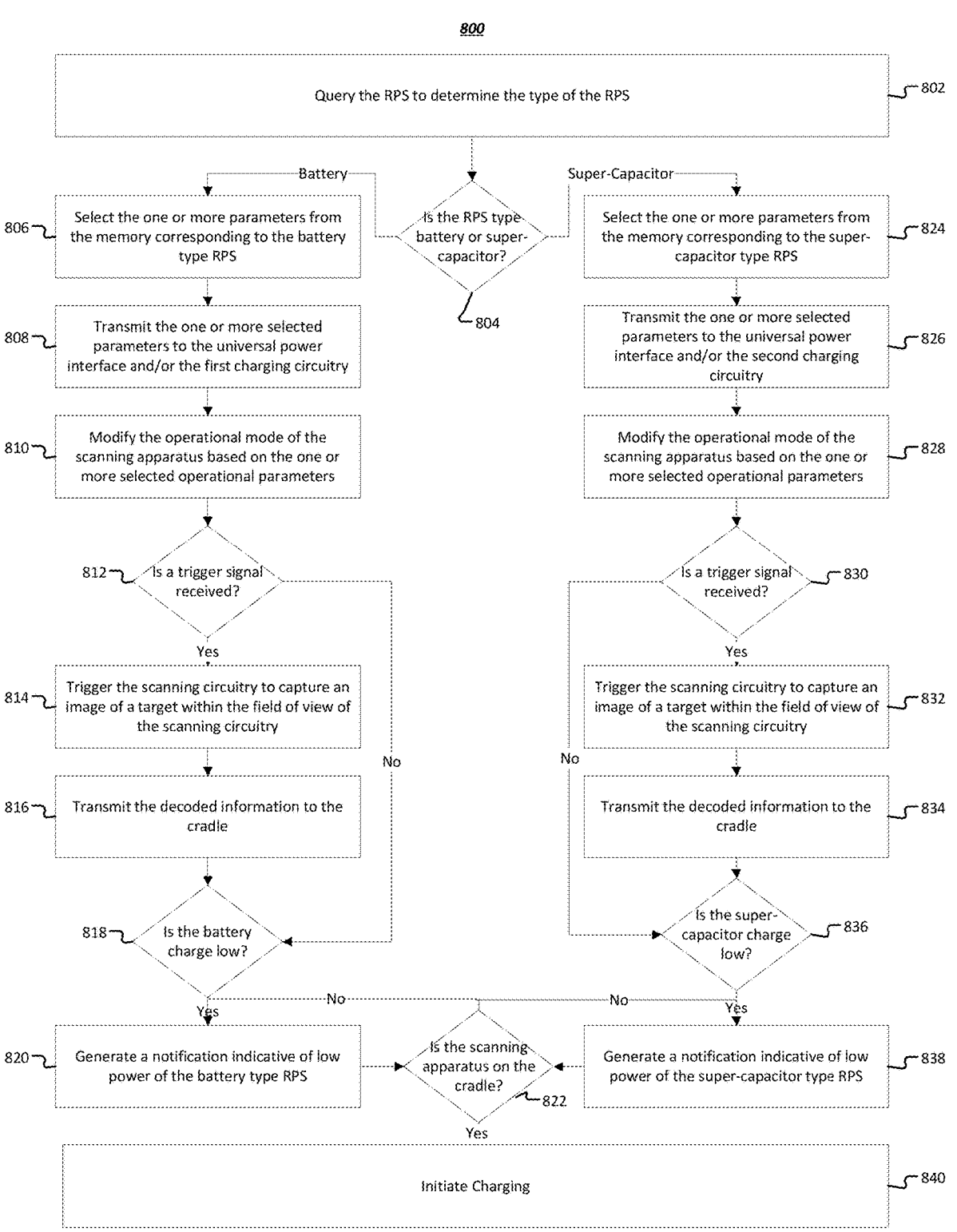
FIG. 8 shows a flowchart illustrating a method for operating the scanning apparatus according to one or more embodiments described herein.

FIG. 8 illustrates a flowchart 800 of a method for operating the scanning apparatus 101, according to one or more embodiments described herein.

At step 802, the scanning apparatus 101 includes means, such as the control system 302, the processor 702, the optimization circuitry 710, and/or the like, for querying the RPS (e.g., the RPS 110 or the RPS 112) to determine the type of the RPS (battery type RPS 110 and/or the super-capacitor type RPS 112). In an example embodiment, prior to querying the RPS (e.g., the RPS 110 or the RPS 112), the operator using the scanning apparatus 101 may be configured to load the RPS (e.g., the RPS 110 or the RPS 112) in the scanning apparatus 101. Upon loading the RPS (e.g., the RPS 110 or the RPS 112) the RPS supplies power to the control system 302 causing the processor 702 to boot. In an example embodiment, during booting, the processor 702 may be configured to execute one or more predetermined instructions to initialize one or more components of the scanning apparatus 101. In some examples, the one or more predetermined instructions may include instructions to check the type of RPS (e.g., the RPS 110 or the RPS 112) that has been received by the scanning apparatus 101.

To execute such an instruction, the processor 702 may cause the optimization circuitry 710 to transmit a query to a memory in the RPS (e.g., memory 414 or memory 514). In an example embodiment, the optimization circuitry 710 may be configured to transmit the query over the address/data bus 606 through the RPS communication interface 602.

As discussed above, the memory of the RPS (e.g., memory 414 or memory 514) includes information pertaining to the type of the respective RPS (e.g., the battery type RPS 110 or the super-capacitor RPS 112). Therefore, upon receiving the query from the optimization circuitry 710, the memory 414, 514 may be configured to transmit the information pertaining the type of the respective RPS (e.g., the battery type RPS 110 or the super-capacitor type RPS 112). In an example embodiment, in response to the transmitted query, the optimization circuitry 710 may receive the information pertaining to the type of the RPS (e.g., the battery type).

At step 804, the scanning apparatus 101 includes means, such as the control system 302, the processor 702, the optimization circuitry 710, and/or the like, for determining if the type of the RPS is battery type RPS 110 or the super-capacitor type RPS 112, based on the received information pertaining to the type of the RPS received from the RPS (e.g., the RPS 110 or the RPS 112). If the optimization circuitry 710 determines that the RPS installed in the scanning apparatus 101 is battery type RPS 110, the optimization circuitry 710 may be configured to perform the step 806. However, if the optimization circuitry 710 determines that the type of the RPS installed in the scanning apparatus 101 is super-capacitor type RPS 112, the optimization circuitry 710 may be configured to perform the step 824.

At step 806, the scanning apparatus 101 includes means, such as the control system 302, the processor 702, the optimization circuitry 710, and/or the like, for selecting the one or more parameters from the memory 704 corresponding to the battery type RPS 110. In an example embodiment, the one or more parameters may include one or more operational parameters and the one or more charging parameters. In some examples, the one or more operational parameters may include one or more values of the voltage and the current at which the one or more components of the scanning apparatus 101 are to be operated, and a corresponding operational mode of the scanning apparatus 101. In an example embodiment, the values of the voltage and the current may be determined based on the operational mode in which the scanning apparatus 101 operates based on the type of RPS. Some examples of the operational modes may include a low power mode, a normal power mode, and/or the like. In an example embodiment, the values of the voltage and the current in the low power mode may be less than the values of the voltage and current in the normal power mode. Further, in the low power mode, the optimization circuitry 710 may be configured to disable a set of components of the one or more components in the scanning apparatus 101. For example, the optimization circuitry 710 may be configured to disable the illumination source in the scanning circuitry 102.

Additionally or alternatively, the optimization circuitry 710 may also be configured to modify an operating mode, based on the selected operational mode of the scanning apparatus 101, of the remaining components of the scanning apparatus 101. For example, the optimization circuitry 710 may be configured to reduce the exposure of the scanning apparatus 101 (performing a scanning operation). In some embodiments, the optimization circuitry 710 may be configured to switch the communications circuitry 708 to an operation mode that consumes less power. For example, if the communications circuitry 708 correspond to a Bluetooth interface, the optimization circuitry 710 may be configured to operate the Bluetooth interface in Bluetooth Low Energy (BLE) mode, a mode that consumes less energy than Bluetooth classic mode. In an example embodiment, in the Bluetooth classic mode, the Bluetooth interface (e.g., communications circuitry 708) is able to transmit data at maximum data rates that are greater than the data rates available in the BLE mode.

In some example embodiments, in the normal power mode, the optimization circuitry 710 may be configured to enable each of the one or more components of the scanning apparatus 101. Further, the optimization circuitry 710 may be configured to operate each of the one or more components of the scanning circuitry 101 in a mode that allows each of the one or more components to operate without restriction. For example, the optimization circuitry 710 may be configured operate the Bluetooth interface (e.g., communications circuitry 708) in a classic mode that allows the Bluetooth interface to transmit and receive data at a maximum data rate.

In an example embodiment, the one or more charging parameters correspond to the values of the current and voltage at which the RPS (e.g., RPS 110 or the RPS 112) is to be recharged, when the scanning apparatus 101 is mounted on the cradle 106. In some examples, the one or more parameters may be pre-stored in the memory 704 during the manufacturing the scanning apparatus 101. The following table illustrates example values of the one or more parameters corresponding to the different types of the RPS (the battery type RPS 110 and the super-capacitor type RPS 112):

TABLE 1 illustrating the one or more parameters stored in the memory 704.

| Type of RPS | One or more operational parameters | | | One or more charging parameters | |
|---|---|---|---|---|---|
| | Value of operating voltage | Value of operating current | Operational mode | Value of charging voltage | Value of charging current |
| Battery type RPS | 5 Volts | 2 Amperes | Normal mode | 6 Volts | 2 Amperes |
| Super-capacitor type RPS | 3.3 Volts | 1 Ampere | Low power mode | 4 Volts | 1 Ampere |

Since the type of RPS, determined in the step 804, is battery type RPS 110, the optimization circuitry 710 may be configured to select the one or more operational parameters corresponding to the battery type RPS. For example, the optimization circuitry 710 may be configured to select the value of the operating voltage, the value of the operating current, and the value of the operational mode as 5 volts, 2 Ampere, and normal mode, respectively, as the one or more operational parameters. Further, the optimization circuitry 710 may be configured to select the value of charging voltage and the value of charging current as 6 volts and 2 Amperes, respectively.

At step 808, the scanning apparatus 101 includes means, such as the control system 302, the processor 702, the optimization circuitry 710, and/or the like, for transmitting the one or more selected parameters to the universal power interface 114 and/or the first charging circuitry 406. In an example embodiment, the optimization circuitry 510 may be configured to transmit the one or more operational parameters and the one or more charging parameters (constituting the one or more parameters) to the universal power interface 114 and the first charging circuit 406, respectively.

In an example embodiment, in the universal power interface 114, the RPS communication interface 602 may receive both the one or more operational parameters and the one or more charging parameters. The RPS communication interface 602 may be configured to transmit the one or more charging parameters to the battery type RPS 110 over the data/address bus 606. Further, the RPS communication interface 602 may be configured to utilize the one or more operational parameters to modify the operation of the first voltage regulator 604. For example, on receiving the one or more operational parameters, the first voltage regulator 604 may be configured to modify its output voltage and the output current to the values mentioned in the one or more operational parameters. For example, the first voltage regulator 604 may be configured to modify the output voltage to 5 Volts and the output current to 2 Amperes. In an example embodiment, in the battery type RPS, the one or more charging parameters are stored in the memory 414. In an alternative embodiment, based on the reception of the one or more charging parameters, the first charging circuit 406 may be configured to modify the charging current and the charging voltage that will be supplied to the battery 402 when the scanning apparatus 101 is mounted on the cradle 106.

At step 810, the scanning apparatus 101 includes means, such as the control system 302, the processor 702, the optimization circuitry 710, and/or the like, for modifying the operational mode the scanning apparatus 101 based on the one or more selected operational parameters. As the one or more selected operational parameters correspond to the battery type RPS 110, the one or more operational parameters include the operational mode as the normal operational mode. As described, in the normal mode, the optimization circuitry 710 may be configured to enable each of the one or more components in the scanning apparatus 101. Further, in the normal mode, the optimization circuitry 710 may be configured to operate the Bluetooth interface (communications circuitry 708) in the classic mode. Since the type of RPS installed in the scanning apparatus 101 is battery type RPS 110 and the battery type RPS 110 can supply power to the scanning apparatus 101 for a longer duration in comparison to the super-capacitor type RPS 112, therefore, the operator using the scanning apparatus 101 may be able use the scanning apparatus 101 in scenarios where the worker has move around a warehouse to carry out multiple scanning operations.

At step 812, the scanning apparatus 101 includes means, such as the control system 302, the processor 702, the input/output circuitry 706, and/or the like, for determining whether a trigger signal is received. In an example embodiment, the trigger 104 may be configured to generate the trigger signal when the operator of the scanning apparatus 101 presses or otherwise engages the trigger 104. Further, the input/output circuitry 706 may be configured to receive the trigger signal. In an example embodiment, if the input/output circuitry 706 receives the trigger signal, the processor 702 may be configured to perform the step 814. However, if the input/output circuitry 706 does not receives the trigger signal, the processor 702 may be configured to perform the step 818.

At step 814, the scanning apparatus 101 includes means, such as the control system 302, the processor 702, the input/output circuitry 706, and/or the like, for triggering the scanning circuitry 102 to capture an image of a target within the field of view of the scanning circuitry 102. Thereafter, the processor 702 may be configured to decode the information from the captured image using known decoding techniques. In some examples, the processor 702 may be configured to store the decoded information in the memory 704.

At step 816, the scanning apparatus 101 includes means, such as the control system 302, the processor 702, the communications circuitry 708, and/or the like, for transmitting the decoded information to the cradle 106. As discussed above, the scanning apparatus 101 and the cradle 106 are communicatively coupled with each other over a wireless network (such as Bluetooth). Therefore, the communications circuitry 708 may be configured to transmit the decoded information to the cradle 106 over the wireless network.

At step 818, the scanning apparatus 101 includes means, such as the control system 302, the processor 702, the optimization circuitry 710, and/or the like, for determining whether the power of the battery type RPS 110 is less than a predetermined power threshold (e.g., low battery charge). In an example embodiment, the predetermined power threshold may correspond to a value of voltage and/or current below which the optimization circuitry 710 may determine that the battery type RPS 110 has low power and requires recharging. In an example embodiment, if the optimization circuitry 710 determine that the power of the battery type RPS 110 is less than the power threshold, the optimization circuitry 710 may be configured to perform the step 820. However, if the optimization circuitry 710 determines that power of the battery type RPS 110 is greater than the power threshold, the optimization circuitry 710 may be configured to repeat the step 810.

At step 820, the scanning apparatus 101 includes means, such as the control system 302, the processor 702, the optimization circuitry 710, and/or the like, for generating a notification indicative of low power of the battery type RPS 110. In an example embodiment, the optimization circuitry 710 may be configured to switch ON an LED that may indicate to the operator that the battery type RPS 110 is running low. Accordingly, the operator may mount the scanning apparatus 101 on the cradle 106.

At step 822, the scanning apparatus 101 includes means, such as the control system 302, the processor 702, and/or the like, for determining whether the scanning apparatus 101 is mounted on the cradle 106. In an example embodiment, the processor 702 may be configured to determine that the scanning apparatus 101 is mounted to the cradle 106 based on the reception of power from the cradle. If the processor 702 determines that the scanning apparatus 101 has not been mounted on the cradle 106, the processor 702 may be configured to repeat the step 818. However, if the processor 702 determine that the scanning apparatus 101 has been mounted on the cradle, the processor 702 may be configured to initiate charging of the scanning apparatus 101 at step 840. In an example embodiment, the processor 702 may be configured to transmit an instruction to the first charging circuit 406 in the battery type RPS 110 to initiate charging of the battery 402.

On receiving the instructions, the first charging circuit 406 may be configured to charge the battery 402 based on the one or more charging parameters. For example, the first charging circuit 406 may be configured to supply current and voltage to the battery 402 in accordance with the value of the charging current and the voltage, determined from the one or more charging parameters stored in the memory 414.

Referring back to the step 804, if the optimization circuitry 710 determines that the type of the RPS is super-capacitor type RPS 112, the optimization circuitry 710 may be configured to perform the step 824. At step 824, the scanning apparatus 101 includes means, such as the control system 302, the processor 702, the optimization circuitry 710, and/or the like, for selecting the one or more parameters from the memory 704 corresponding to the super-capacitor type RPS 112. In some examples, the optimization circuitry 710 may be configured to utilize the one or more parameters illustrated in Table 1 above to select the one or more parameters. For example, the optimization circuitry 710 may determine the one or more operational parameters as 3.3 Volts as operating voltage and 1 Ampere as operating current. Further, the optimization circuitry 710 may determine the charging voltage as 4 Volts and the charging current as 1 Ampere. Additionally, the optimization circuitry 710 may select the operational mode as the low power mode, as the super-capacitor 502 discharges more quickly as compared to the battery 402 of FIG. 4. As described above, in the low power mode, the optimization circuitry 710 may be configured to disable a set of components of the one or more components in the scanning apparatus 101. Further, in the low power mode, the optimization circuitry 710 may be configured to switch the communications circuitry 708 (e.g., Bluetooth interface) into the low power mode (e.g., the BLE mode).

At step 826, the scanning apparatus 101 includes means, such as the control system 302, the processor 702, the optimization circuitry 710, and/or the like, for transmitting the one or more parameters to the universal power interface 114 and the second charging circuitry 506 in a similar manner, as is described above in conjunction with step 808.

At step 828, the scanning apparatus 101 includes means, such as the control system 302, the processor 702, the optimization circuitry 710, and/or the like, for modifying the operational mode the scanning apparatus 101 based on the one or more selected operational parameters. As the optimization circuitry 710 determines the operational mode as low power mode, optimization circuitry 710 may be configured to disable the set of components of the one or more components in the scanning apparatus 101. For example, as discussed above, the optimization circuitry 710 may be configured to disable the illumination source in the scanning circuitry 102. Further, as discussed, the optimization circuitry 710 may switch the communications circuitry 708 in low power mode.

At step 830, the scanning apparatus 101 includes means, such as the control system 302, the processor 702, the input/output circuitry 706, and/or the like, for determining whether a trigger signal is received. In an example embodiment, the trigger 104 may be configured to generate the trigger signal when the operator of the scanning apparatus 101 presses or otherwise engages the trigger button 104. Further, the input/output circuitry 706 may be configured to receive the trigger signal. In an example embodiment, if the input/output circuitry 706 receives the trigger signal, the processor 702 may be configured to perform the step 832. However, if the input/output circuitry 706 does not receives the trigger signal, the processor 702 may be configured to perform the step 836.

At step 832, the scanning apparatus 101 includes means, such as the control system 302, the processor 702, the input/output circuitry 706, and/or the like, for triggering the scanning circuitry 102 to capture an image of a target within the field of view of the scanning circuitry 102. Since the illumination source of the scanning circuitry 102 is disabled, therefore, the scanning circuitry 102 may be configured to capture the image in low exposure, when the scanning apparatus 101 is operating in low power mode. In some examples, the scope of the disclosure is not limited to only altering the exposure of the scanning circuitry 102 in the low power mode. In alternative embodiment, other parameters, such as, but not limited to, shutter speed may also be altered in low power mode. Thereafter, the processor 702 may be configured to decode the information from the captured image using known decoding techniques. In some examples, the processor 702 may be configured to store the decoded information in the memory 704.

At step 834, the scanning apparatus 101 includes means, such as the control system 302, the processor 702, the communications circuitry 708, and/or the like, for transmitting the decoded information to the cradle 106. As discussed, the scanning apparatus 101 and the cradle 106 are communicatively coupled with each other over a wireless network (such as Bluetooth). Therefore, the communications circuitry 708 may be configured to transmit the decoded information to the cradle over the wireless network. Further, since the communications circuitry 708 is operating in the low power mode (e.g., BLE mode), therefore the decoded data may be transmitted using the low power mode transmission protocols such as BLE transmission protocols.

At step 836, the scanning apparatus 101 includes means, such as the control system 302, the processor 702, the optimization circuitry 710, and/or the like, for determining whether the power of the super-capacitor type RPS 112 is less than the predetermined power threshold (e.g., the super-capacitor charge is low). In an example embodiment, if the optimization circuitry 710 determine that the power of the super-capacitor type RPS 112 is less than the power threshold, the optimization circuitry 710 may be configured to perform the step 838. However, if the optimization circuitry 710 determines that power of the super-capacitor type RPS 112 is greater than the power threshold, the optimization circuitry 710 may be configured to repeat the step 830.

At step 838, the scanning apparatus 101 includes means, such as the control system 302, the processor 702, the optimization circuitry 710, and/or the like, for generating the notification indicative of low power of the super-capacitor type RPS 112. In an example embodiment, the optimization circuitry 710 may be configured to switch ON an LED that may indicate to the operator that the super-capacitor type RPS 112 is running low. Accordingly, the operator may mount the scanning apparatus 101 on the cradle 106.

At step 822, the scanning apparatus 101 includes means, such as the control system 302, the processor 702, and/or the like, for determining whether the scanning apparatus 101 is mounted on the cradle 106. In an example embodiment, the processor 702 may be configured to determine that the scanning apparatus 101 is mounted to the cradle 106 based on the reception of power from the cradle. If the processor 702 determines that the scanning apparatus 101 has not been mounted on the cradle 106, the processor 702 may be configured to repeat the step 838. However, if the processor 702 determine that the scanning apparatus 101 has been mounted on the cradle, the processor 702 may be configured to initiate charging of the scanning apparatus 101. In an example embodiment, the processor 702 may be configured to transmit the instruction to the second charging circuit 506 in the super-capacitor type RPS 112 to initiate charging of the super-capacitor 502.

On receiving the instructions, the second charging circuit 506 may be configured to charge the super-capacitor 502 based on the one or more charging parameters. For example, the second charging circuit 506 may be configured to supply current and voltage to the super-capacitor 502 in accordance with the value of the charging current and the voltage, determined from the one or more charging parameters stored in the memory 514.

In some examples, when the optimization circuitry 710 causes the communications circuitry 708 to switch to a low power mode (e.g., BLE mode) or normal power mode (e.g., classic mode), the communications circuitry 708 may be configured to transmit the information pertaining to the operation mode of the communications circuitry 708 to the cradle 106. One such method of communicating the information pertaining to the operation mode of the communications circuitry 708 is described in conjunction with FIG. 9.

Figure 9:
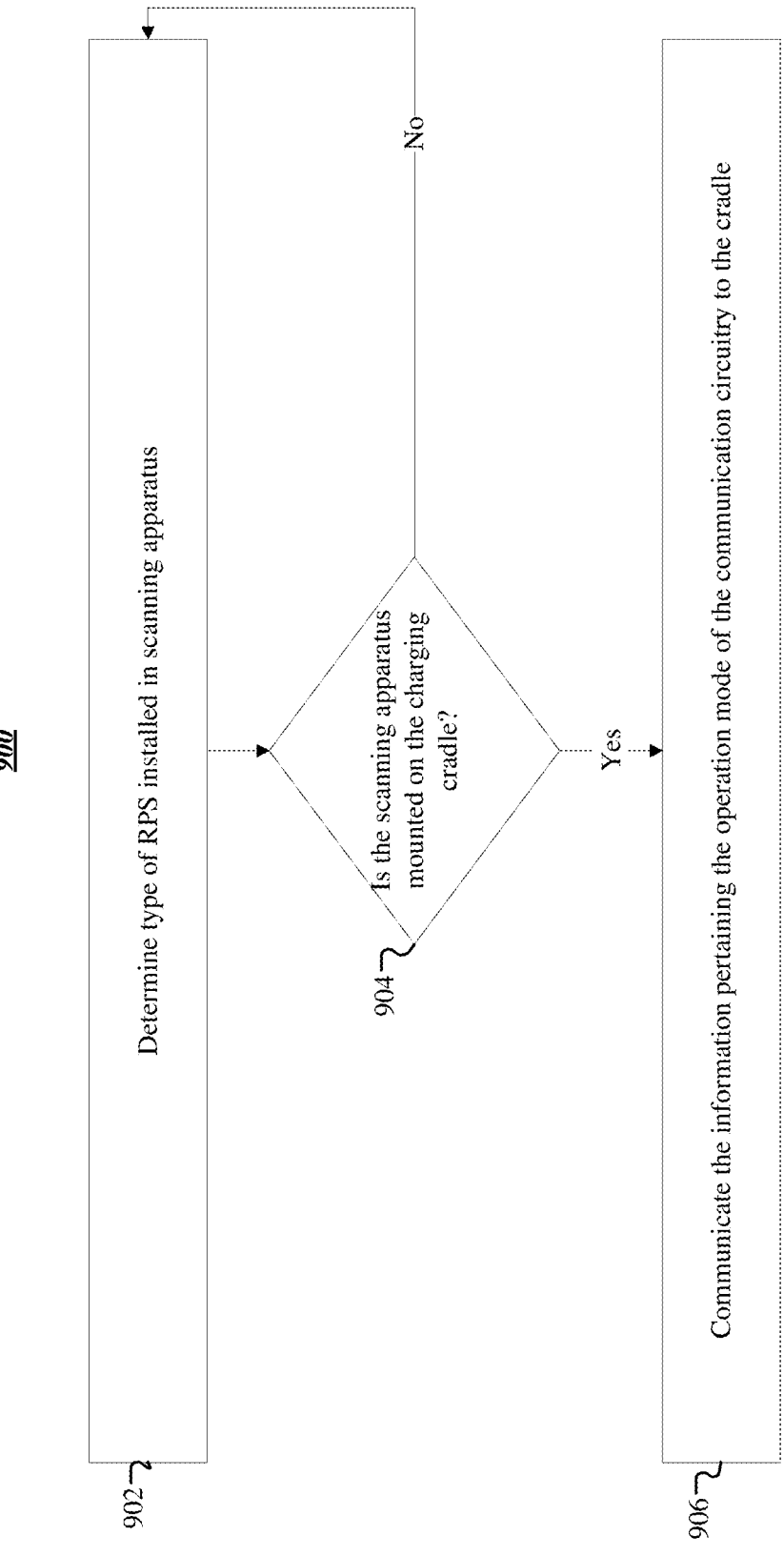
FIG. 9 shows a flowchart illustrating a method for communication between the scanning apparatus and the charging cradle according to one or more embodiments described herein.

FIG. 9 illustrates a flowchart 900 of a method for communication between the scanning apparatus 101 and the charging cradle 106, according to one or more embodiments described herein.

At step 902, the scanning apparatus 101 may include means such as, the control system 302, the processor 702, the optimization circuitry 710, and/or the like, for determining the type of RPS (e.g., battery type RPS 110 or super-capacitor type RPS 112) installed in the scanning apparatus 101. In an example embodiment, the optimization circuitry 710 may be configured to utilize methodologies described above in step 802 to determine the type of the RPS installed in the scanning apparatus 101.

At step 904, the scanning apparatus 101 may include means, such as the control system 302, the processor 702, the optimization circuitry 710, and/or the like, for determining whether the scanning apparatus 101 is mounted on the charging cradle 106. In an example embodiment, the processor 702 may be configured to determine that the scanning apparatus 101 is mounted to the cradle 106 based on the scanning apparatus receiving power from the charging cradle 106. If the optimization circuitry 710 determines that the scanning apparatus 101 is mounted on the charging cradle 106, the optimization circuitry 710 may be configured to perform step 906. If the optimization circuitry 710 determines that the scanning apparatus 101 is not mounted on the charging cradle 106, the optimization circuitry 710 may be configured to repeat step 904.

At step 906, the scanning apparatus 101 may include means, such as the control system 302, the processor 702, the communications circuitry 708, and/or the like, for communicating the information pertaining to the operation mode of the communications circuitry 708 to the charging cradle 106. As described above, the operation mode of the communications circuitry 708 is determined based on the type of RPS (e.g., battery type RPS 110 or super-capacitor type RPS 112) installed in the scanning apparatus 101. For example, if the type of RPS is super-capacitor type RPS 112, the communications circuitry 708 may be configured to operate in the low power mode (e.g., BLE mode). Accordingly, when the scanning apparatus 110 is mounted on the charging cradle 106, the communications circuitry 708 may be configured to communicate the information to the charging cradle 106 pertaining to the low power mode (e.g., BLE mode) of operation of the communications circuitry 708. The charging cradle 106 may be configured to also switch its respective communications circuitry to low power mode (e.g., BLE mode).

As would be evident to one of ordinary skill in the art in light of the present disclosure, when the scanning apparatus 101 is mounted on the charging cradle 106, the address/data bus 606 in the scanning apparatus 101 may be communicatively coupled with a corresponding feature of the charging cradle 106. In an example embodiment, the communications circuitry 708 may be configured to communicate the information pertaining to the operation mode of the communications circuitry 708 to the charging cradle 106 through the address/data bus 606.

In another example, if the type of RPS is the battery type RPS 110, the communications circuitry 708 may be configured to operate in the normal power mode (e.g., Bluetooth classic mode). Accordingly, when the scanning apparatus 110 is mounted on the charging cradle 106, the communications circuitry 708 may be configured to communicate the information to the charging cradle 106 pertaining to the normal power mode (e.g., Bluetooth classic mode) of operation of the communications circuitry 708. Accordingly, the charging cradle 106 may be configured to also switch its respective communications circuitry to normal power mode (e.g., Bluetooth classic mode).

In some examples, the scope of the disclosure is not limited to the scanning apparatus 101 communicating the information pertaining to the operation mode of the communications circuitry 708 to the charging cradle 106 only upon mounting of the scanning apparatus 101 on the charging cradle 106. In an alternative embodiment, the charging cradle 106 may be configured to query the scanning apparatus 101 for retrieving the information pertaining to the operation mode of the communications circuitry 708. For example, the charging cradle 106 may query the optimization circuitry 710 to determine the operation mode of the communications circuitry 708.

In some embodiments, however, the processor 702 and/or the optimization circuitry 710 may be configured to override the one or more parameters indicating that the scanning apparatus 101 is to be operated in a low power mode in order to minimize energy consumption (e.g., use low-energy Bluetooth radio, enter low-power modes, disable WiFi, minimize scanner exposure, etc.). By way of example, in an instance in which the scanning apparatus 101 is wirelessly receiving a firmware update (e.g., a transfer large in size or requiring fast transfer) from the charging cradle 106 of another device in wireless communication with the scanning apparatus 101, the processor 702 may override the low power mode and force the scanning apparatus (e.g., the communications circuitry 708) to operate in a normal or classic mode. One such example method is illustrated in FIG. 10.

Figure 10:
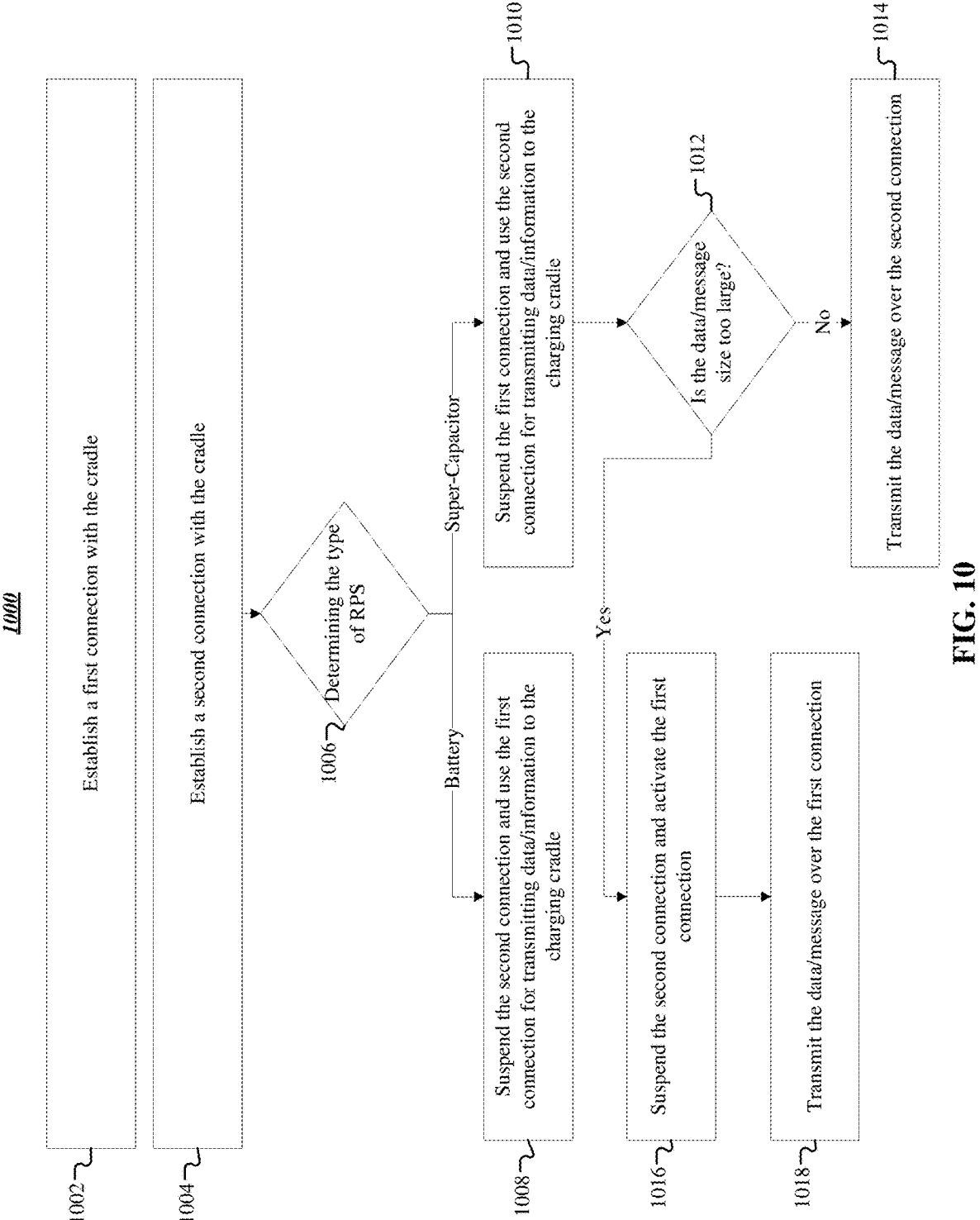
FIG. 10 shows another flowchart illustrating a method for communication between the scanning apparatus and the charging cradle according to one or more embodiments described herein.

FIG. 10 illustrates a flowchart 1000 of a method for communication between the scanning apparatus 101 and the cradle 106, according to one or more embodiments described herein.

At step 1002, the scanning apparatus 101 may include means, such as the control system 302, the processor 702, the communications circuitry 708, and/or the like, for establishing a first connection with the cradle 106. In an example embodiment, the communications circuitry 708 may be configured to establish the first connection in accordance with the normal mode (e.g., Bluetooth classic mode) of operation of the communications circuitry 708.

At step 1004, the scanning apparatus 101 may include means, such as, the control system 302, the processor 702, the communications circuitry 708, and/or the like, for establishing a second connection with the cradle 106. In an example embodiment, the communications circuitry 708 may be configured to establish the second connection in accordance with the low power mode (e.g., BLE mode) of operation of the communications circuitry 708.

At step 1006, the scanning apparatus 101 may include means, such as the control system 302, the processor 702, the optimization circuitry 710, and/or the like, for determining the type of the RPS (e.g., battery type RPS 110 or super-capacitor type RPS 112) installed in the scanning apparatus 101. In an example embodiment, the optimization circuitry 710 may be configured to utilize methodologies described in step 802 to determine the type of the RPS installed in the scanning apparatus 101. If the optimization circuitry 710 determines that the type of RPS installed in the scanning apparatus 101 is battery type RPS 110, the optimization circuitry 710 may be configured to perform step 1008. If the optimization circuitry 710 determines that the type of RPS installed in the scanning apparatus 101 is the super-capacitor type RPS 112, the optimization circuitry 710 may be configured to perform step 1010.

At step 1008, the scanning apparatus 101 may include means, such as the control system 302, the processor 702, the communications circuitry 708, the optimization circuitry 710, and/or the like, for suspending the second connection and using the first connection for transmitting data/information to the charging cradle 106. In an example embodiment, suspending the second connection may correspond to a connection state in which the connection between the scanning apparatus 101 and the charging cradle 106 is switched to a sleep mode (i.e., the connection does not consume energy from the battery type RPS 110). Given that the first connection corresponds to the normal mode operation of the communications circuitry 708, the communications circuitry 708 allows the data/messages to be transmitted as a maximum data rate.

As described above, when the type of the RPS 110 is the super-capacitor type RPS 112, the optimization circuitry 710 may be configured to perform step 1010. At step 1010, the scanning apparatus 101 may include means, such as the control system 302, the processor 702, the communications circuitry 708, the optimization circuitry 710, and/or the like, for suspending the first connection and using the second connection for transmitting data/information to the charging cradle 106. As described above, the second connection is in accordance with low power mode operation of the communications circuitry 708. Therefore, the communications circuitry 708 may be configured to transmit data/messages at a lower bit rate on the second connection as compared to the bit rate of the first connection.

At step 1012, the scanning apparatus 101 may include means, such as, the control system 302, the processor 702, the communications circuitry 708, the optimization circuitry 710, and/or the like, for determining whether a size of the data/messages to be transmitted/received is greater than a predetermined size threshold (e.g., is the data/message size too large). In an example embodiment, if the optimization circuitry 710 determines that the size of the data/messages to be transmitted/received is less than the predetermined size threshold, the optimization circuitry 710 is configured to perform step 1014. If the optimization circuitry 710 determines that the size of the data/messages to be transmitted/received is greater than the predetermined size threshold, the optimization circuitry 710 may be configured to perform step 1016.

At step 1014, the scanning apparatus 101 may include means, such as the control system 302, the processor 702, the communications circuitry 708, the optimization circuitry 710, and/or the like, for transmitting the data/message over the second connection.

At step 1016, the scanning apparatus 101 may include means, such as the control system 302, the processor 702, the communications circuitry 708, the optimization circuitry 710, and/or the like, for suspending the second connection and activating the first connection.

At step 1018, the scanning apparatus 101 may include means, such as the control system 302, the processor 702, the communications circuitry 708, the optimization circuitry 710, and/or the like, for transmitting the data/messages over the first connection. Thereafter, step 1010 is repeated (i.e., the first connection is suspended and the second connection is activated).

Therefore, by switching between the two connections, the scanning apparatus 101 is able to transmit large sized data quickly on the first connection rather than on the second connection, as the second connection requires longer time to transmit the large sized data/messages. As such, the productivity of the overall system is not hampered due to changing of the type of RPS installed in the scanning apparatus 101.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of the scanning apparatus 101.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

That which is claimed:

1. A system comprising:
a charging cradle; and
a scanning apparatus communicatively coupled with the charging cradle, wherein the scanning apparatus comprises:
a communications circuitry;
a universal power interface configured to receive a removable power source connected thereto, wherein the removable power source comprises a power storage unit and a charging circuit; and
a control system comprising one or more processor configured to:
determine a type of the removable power source connected to the scanning apparatus;
select one or more charging parameters based on the determined type of the removable power source;
transmit the selected one or more charging parameters to the universal power interface and/or the charging circuit;
modify an operational mode of the scanning apparatus based on the selected one or more charging parameters;
determine if a charge of the removable power source is less than a predetermined power threshold;
determine if the scanning apparatus is mounted on the charging cradle; and
initiate charging of the removable power source if it is determined that the charge of the removable power source is less than the predetermined power threshold and the scanning apparatus is mounted on the charging cradle.

2. The system according to claim 1, wherein the scanning apparatus is configured to operate in a low power mode and/or a normal mode.

3. The system according to claim 1, wherein the one or more processor are further configured to, via connection with the universal power interface, query a memory of the removable power source to identify the type of the removable power source.

4. The system according to claim 1, wherein the type of the removable power source comprises a battery type removable power source, wherein the battery type removable power source comprises a battery as the power storage unit.

5. The system according to claim 1, wherein the type of the removable power source comprises a super-capacitor type removable power source, wherein the super-capacitor type removable power source comprises a super-capacitor as the power storage unit.

6. The system according to claim 1, wherein the communications circuitry is configured to provide wireless communication between the scanning apparatus and the charging cradle.

7. The system according to claim 1, wherein the scanning apparatus further comprising a docking interface configured to provide electrical communication between the charging cradle and the removable power source received by the scanning apparatus.

8. A scanning apparatus communicatively coupled with a charging cradle, wherein the scanning apparatus comprises:
a communications circuitry;
a universal power interface configured to receive a removable power source connected thereto, wherein the removable power source comprises a power storage unit and a charging circuit; and
a control system comprising one or more processor configured to:
determine a type of the removable power source connected to the scanning apparatus;
select one or more charging parameters based on the determined type of the removable power source;
transmit the selected one or more charging parameters to the universal power interface and/or the charging circuit;
modify an operational mode of the scanning apparatus based on the selected one or more charging parameters;
determine if a charge of the removable power source is less than a predetermined power threshold;
determine if the scanning apparatus is mounted on the charging cradle; and
initiate charging of the removable power source if it is determined that the charge of the removable power source is less than the predetermined power threshold and the scanning apparatus is mounted on the charging cradle.

9. The scanning apparatus according to claim 8, wherein the scanning apparatus is configured to operate in a low power mode and/or a normal mode.

10. The scanning apparatus according to claim 8, wherein the one or more processor are further configured to, via connection with the universal power interface, query a memory of the removable power source to identify the type of the removable power source.

11. The scanning apparatus according to claim 10, wherein the type of the removable power source comprises a battery type removable power source, wherein the battery type removable power source comprises a battery as the power storage unit.

12. The scanning apparatus according to claim 10, wherein the type of the removable power source comprises a super-capacitor type removable power source, wherein the super-capacitor type removable power source comprises a super-capacitor as the power storage unit.

13. The scanning apparatus according to claim 8, wherein the communications circuitry is configured to provide wireless communication between the scanning apparatus and the charging cradle.

14. The scanning apparatus according to claim 8, further comprising a docking interface configured to provide electrical communication between the charging cradle and the removable power source received by the scanning apparatus.

15. A method comprises:
determining a type of a removable power source connected to a scanning apparatus;

selecting one or more charging parameters based on the determined type of the removable power source;

transmitting the selected one or more charging parameters to an universal power interface and/or a charging circuit;

modifying an operational mode of the scanning apparatus based on the selected one or more charging parameters;

determining if a charge of the removable power source is less than a predetermined power threshold;

determining if the scanning apparatus is mounted on a charging cradle; and initiating charging of the removable power source if it is determined that the charge of the removable power source is less than the predetermined power threshold and the scanning apparatus is mounted on the charging cradle.

16. The method according to claim 15, further comprising, operating the scanning apparatus in a low power mode and/or a normal mode.

17. The method according to claim 15, further comprising, querying, via connection with the universal power interface, a memory of the removable power source to identify the type of the removable power source.

18. The method according to claim 17, wherein the type of the removable power source comprises a battery type removable power source, wherein the removable power source comprises a power storage unit, and wherein the battery type removable power source comprises a battery as the power storage unit.

19. The method according to claim 17, wherein the type of the removable power source comprises a super-capacitor type removable power source, wherein the removable power source comprises a power storage unit, and wherein the super-capacitor type removable power source comprises a super-capacitor as the power storage unit.

20. The method according to claim 15, further comprising, providing a wireless communication between the scanning apparatus and the charging cradle.

* * * * *